(12) United States Patent
Setiawan et al.

(10) Patent No.: US 11,006,111 B2
(45) Date of Patent: May 11, 2021

(54) ADAPTIVE QUANTIZATION OF WEIGHTED MATRIX COEFFICIENTS

(71) Applicant: HUAWEI TECHNOLOGIES CO., LTD., Guangdong (CN)

(72) Inventors: Panji Setiawan, Munich (DE); Eyal Shlomot, Long Beach, CA (US)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 107 days.

(21) Appl. No.: 15/933,251

(22) Filed: Mar. 22, 2018

(65) Prior Publication Data

US 2018/0213229 A1 Jul. 26, 2018

Related U.S. Application Data

(63) Continuation of application No. PCT/EP2016/056076, filed on Mar. 21, 2016.

(51) Int. Cl.
*H04N 19/124* (2014.01)
*H04N 19/94* (2014.01)
(Continued)

(52) U.S. Cl.
CPC ......... *H04N 19/124* (2014.11); *G10L 19/008* (2013.01); *G10L 19/038* (2013.01);
(Continued)

(58) Field of Classification Search
CPC ..... G10L 19/008; G10L 19/038; G10L 19/22; H04N 19/119; H04N 19/124; H04N 19/157; H04N 19/172; H04N 19/94

See application file for complete search history.

(56) References Cited

U.S. PATENT DOCUMENTS 4,878,230 A * 10/1989 Murakami .............. G06T 9/008
375/245
5,337,085 A * 8/1994 Lee ........................ G06T 9/008
375/240.11
(Continued)

FOREIGN PATENT DOCUMENTS

CN 101147191 A 3/2008
CN 102081926 B 6/2013
(Continued)

OTHER PUBLICATIONS

Richardson, The H.264 Advanced Video Compression Standard, 2010, Wiley, 2nd Edition, Extraction, pp. 349.*
(Continued)

*Primary Examiner* — Peter D Le
(74) *Attorney, Agent, or Firm* — Womble Bond Dickinson (US) LLP

(57) ABSTRACT

A method for encoding an input signal comprising signal frames into quantized bits is disclosed, the method comprises generating, for each frame of the input signal, a signal matrix comprising matrix coefficients obtained from that frame, grouping the matrix coefficients of each signal matrix into a plurality of partition vectors, and for each partition vector, selecting one vector quantization scheme from among a plurality of vector quantization schemes and quantizing that partition vector according to the selected vector quantization scheme to obtain the quantized bits. In an adaptive mode, the method comprises grouping differently the matrix coefficients obtained from different frames, and/or selecting different vector quantization schemes for partition vectors obtained from different frames.

19 Claims, 4 Drawing Sheets

(51) Int. Cl.
  *G10L 19/008* (2013.01)
  *H04N 19/119* (2014.01)
  *H04N 19/157* (2014.01)
  *H04N 19/172* (2014.01)
  *G10L 19/038* (2013.01)
  *G10L 19/22* (2013.01)

(52) U.S. Cl.
  CPC ......... *H04N 19/119* (2014.11); *H04N 19/157* (2014.11); *H04N 19/172* (2014.11); *H04N 19/94* (2014.11); *G10L 19/22* (2013.01)

(56) References Cited

U.S. PATENT DOCUMENTS

| | | | | |
|---|---|---|---|---|
| 5,513,128 | A * | 4/1996 | Rao | H04N 19/63 348/384.1 |
| 5,757,668 | A * | 5/1998 | Zhu | H04N 19/176 345/474 |
| 5,819,215 | A * | 10/1998 | Dobson | G06T 9/007 704/230 |
| 5,819,224 | A | 10/1998 | Xydeas | |
| 5,826,225 | A * | 10/1998 | Hartung | G06T 9/008 704/222 |
| 6,069,631 | A * | 5/2000 | Tao | G06T 13/00 345/418 |
| 6,249,614 | B1 | 6/2001 | Kolesnik et al. | |
| 6,392,705 | B1 * | 5/2002 | Chaddha | G06T 9/40 348/388.1 |
| 6,879,732 | B1 * | 4/2005 | Sokolov | G06K 9/40 348/607 |
| 2002/0044604 | A1 * | 4/2002 | Nieweglowski | H04N 19/51 375/240.03 |
| 2002/0090029 | A1 * | 7/2002 | Kim | H04N 21/23406 375/240.03 |
| 2002/0146149 | A1 * | 10/2002 | Brunk | G06T 1/005 382/100 |
| 2003/0004713 | A1 * | 1/2003 | Makino | G10L 19/07 704/230 |
| 2003/0039401 | A1 * | 2/2003 | Gallagher | G06T 7/41 382/275 |
| 2003/0101051 | A1 * | 5/2003 | Raj | G10L 15/02 704/219 |
| 2003/0113002 | A1 * | 6/2003 | Philomin | G06K 9/00885 382/116 |
| 2003/0231797 | A1 * | 12/2003 | Cullen | G06T 9/005 382/239 |
| 2004/0044527 | A1 * | 3/2004 | Thumpudi | G10L 19/008 704/230 |
| 2004/0108944 | A1 * | 6/2004 | Lee | H03M 7/3082 341/50 |
| 2006/0277040 | A1 * | 12/2006 | Sung | G10L 19/24 704/219 |
| 2007/0162236 | A1 * | 7/2007 | Lamblin | H03M 7/3082 702/20 |
| 2008/0013847 | A1 * | 1/2008 | Li | H04N 19/147 382/248 |
| 2008/0249767 | A1 * | 10/2008 | Ertan | G10L 19/005 704/219 |
| 2009/0055172 | A1 | 2/2009 | Yoshida | |
| 2009/0196361 | A1 * | 8/2009 | Chan | H04L 1/0045 375/260 |
| 2010/0023325 | A1 * | 1/2010 | Bessette | G10L 19/06 704/219 |
| 2010/0023336 | A1 | 1/2010 | Shmunk | |
| 2012/0046955 | A1 * | 2/2012 | Rajendran | G10L 19/028 704/500 |
| 2012/0065965 | A1 * | 3/2012 | Choo | G10L 21/038 704/203 |
| 2012/0127003 | A1 * | 5/2012 | Shibahara | H04N 19/122 341/87 |
| 2012/0128065 | A1 * | 5/2012 | Shibahara | H04N 19/122 375/240.03 |
| 2012/0259644 | A1 | 10/2012 | Lin et al. | |
| 2014/0133553 | A1 | 5/2014 | Shima | |
| 2016/0275955 | A1 | 9/2016 | Liu et al. | |
| 2017/0094314 | A1 * | 3/2017 | Zhao | H04N 19/61 |
| 2018/0014027 | A1 * | 1/2018 | Kim | H04N 19/176 |

FOREIGN PATENT DOCUMENTS

| | | |
|---|---|---|
| CN | 104681028 A | 6/2015 |
| EP | 1995967 A1 | 11/2008 |

OTHER PUBLICATIONS

Herre, J., Hilpert, J., Kuntz, A., and Plogsties, J., "MPEG-H Audio—the new standard for universal spatial / 3D audio coding" in Journal of Audio Engineering Society, vol. 62, Issue 12, Dec. 2014, 12 pages.

Yang, D., Ai, H., Kyriakakis, C., Kuo, C.-C. J., "Adaptive Karhunen-Loeve transform for enhanced multichannel audio coding" in Mathematics of Data/Image Coding, Compression, and Encryption IV, with Applications, vol. 4475, of Proc. SPIE, Jul. 2001, 12 pages.

Pamela C. Cosman et al., Vector Quantization of Image Subbands: A Survey. IEEE Transactions on Image Processing, vol. 5, No. 2, Feb. 1996, 24 pages.

Paliwal, K.K. and Atal, B.S., "Efficient Vector Quantization of LPC Parameters at 24 bits/frame," IEEE Transactions on Speech and Audio Processing, vol. 1, No. 1, Jan. 1993, 12 pages.

Gersho, A. and Gray, R.M., "Vector Quantization and Signal Compression," Springer, 1992, 1 page.

\* cited by examiner

ADAPTIVE QUANTIZATION OF WEIGHTED MATRIX COEFFICIENTS

CROSS-REFERENCE TO RELATED APPLICATIONS

This application is a continuation of International Application No. PCT/EP2016/056076, filed on Mar. 21, 2016, the disclosure of which is hereby incorporated by reference in its entirety.

TECHNICAL FIELD

Embodiments of the disclosure generally relate to the field of audio and/or video encoding. Embodiments of the disclosure specifically relate to an encoder for encoding an input signal comprising audio and/or video frames into quantized bits, a decoder for decoding quantized bits into an output signal comprising audio and/or video frames, and corresponding encoding and decoding methods. Finally, embodiments of the disclosure relate to a computer program having a program code for performing such a method.

BACKGROUND

In audio and/or video applications, a common problem is to efficiently encode large input data. For example, known audio applications may be based on coding schemes involving more than 6 channels (5.1), whereas future coding schemes are expected to take an arbitrary number of input channels so that even more channels and more input data will have to be processed and encoded. Also, it is already known to use a channel/object coding scheme for 22.2 channels, see Herre, J., Hilpert, J., Kuntz, A., and Plogsties, J., "MPEG-H Audio—The new standard for universal spatial/3D audio coding" in *Journal of Audio Engineering Society*, Vol. 62, Issue 12, pp. 821-830, December 2014, and a spherical microphone supporting up to 32 channels.

In this respect, one of the crucial problems to solve is to find a way to efficiently encode a large number of matrix coefficients or elements. These matrix coefficients typically originate from a specific type of matrix like a covariance matrix. The evidence is clearly shown for example in Karhunen-Loeve Transform (KLT) based audio coding scheme, see Yang, D., Ai, H., Kyriakakis, C., Kuo, C.-C. J., "Adaptive Karhunen-Loeve transform for enhanced multichannel audio coding" in *Mathematics of Data/Image Coding, Compression, and Encryption IV, with Applications*, vol. 4475, of Proc. SPIE, pp. 43-54, July 2001. This scheme requires the transmission of at least one covariance matrix of size M×M, where M denotes the number of input channels. The number of matrices can even be more important if the encoding is done in the frequency domain. Also, the number of matrices increases further if the processing has to be updated on a frame basis like e.g. every 20 ms.

In the field of image or video encoding, the encoding problem is even more obvious. In such a case, the matrix to be encoded can be, instead of a square matrix, a non-symmetric and rectangular one. The matrix to be quantized basically consists of picture elements obtained from an image input signal. An overview for more description of applications in image coding is presented e.g. Cosman, P. C., Gray, R. M., Vetterli, M., "Vector Quantization of Image Subbands: A survey," in *IEEE Transactions on Image Processing*, vol. 5, no. 2, February 1996.

A known way to quantize a large number of matrix coefficients consists in simply doing a scalar quantization or a one-dimensional vector quantization (1-D VQ). However, it is well known that the corresponding encoding efficiency is limited and not impressive. Other known ways to encode a large number of matrix coefficients employ several state-of-the-art vector quantization (VQ) schemes such as direct VQ, split VQ, or gain-shape VQ. One of the main problems of the known art is however the difficulty in choosing one particular scheme that is suitable for a set of common input signals. Other known encoders try to perform a pre-processing on the matrix itself prior to applying a VQ scheme. An example of such a pre-processing consists in zeroing the diagonal elements of the matrix through a transformation procedure.

SUMMARY

Having recognized the above-mentioned disadvantages and problems, one embodiment of the disclosure aims to improve the state of the art. In particular, the object of one embodiment of the disclosure is to provide an encoder, an encoding method, a decoder, and a decoding method for an improved encoding/decoding of an input signal comprising e.g. signal frames.

One embodiment of the disclosure particularly intends to improve the encoding/decoding for large input data. One embodiment of the disclosure also intends to improve the choice of vector quantization scheme for an input signal, and e.g. for a set of common input signals.

The above-mentioned object of the embodiment is achieved by the solution provided in the enclosed independent claims. Advantageous implementations of embodiments of the disclosure are further defined in the respective dependent claims.

A first aspect of the disclosure relates to an encoder for encoding an input signal comprising signal frames into quantized bits. The encoder comprises at least one matrix generation module configured to generate, for each frame of the input signal, a signal matrix comprising matrix coefficients obtained from that frame. The encoder comprises at least one quantizer module comprising a partition module configured to group the matrix coefficients of each signal matrix into a plurality of partition vectors, and a vector quantization module. The vector quantization module comprises a plurality of vector quantization schemes and is configured to, for each partition vector, select one of the vector quantization schemes and quantize that partition vector according to the selected vector quantization scheme to obtain the quantized bits. In an adaptive mode, the partition module is able to group differently the matrix coefficients obtained from different frames, and/or the vector quantization module is able to select different vector quantization schemes for partition vectors obtained from different frames. Thereby, the partition may be optimized from frame to frame, and a vector quantization may be optimized from frame to frame.

In one embodiment, at least one vector quantization scheme comprises a splitting unit configured to split at least one of the plurality of partition vectors or a vector derived from said at least one of the plurality of partition vectors into several sub-vectors. The at least one vector quantization scheme comprises a quantizing unit configured to quantize each sub-vector by selecting a codebook entry from a respective codebook of codebook entries yielding a quantized partition sub-vector. The quantization unit is further configured to output, for each sub-vector, an index of the selected codebook entry of the respective codebook selected during quantizing. The selection of the codebook entry is done by applying a weight to each of the elements of the codebook entry. Thereby, it is possible to choose an optimized vector quantization scheme based on a weighted error measure.

In one embodiment, at least one of the plurality of vector quantization schemes is based on a common-gain-split-shape vector quantization scheme and comprises:
a gain unit configured to obtain a gain from the at least one of the plurality of partition vectors,
a quantization unit configured to quantize the gain to obtain a quantized gain, a normalization unit configured to normalize the at least one of the plurality of partition vectors according to the quantized gain to obtain a normalized partition vector,
the splitting unit configured to split the normalized partition vector into several sub-vectors, and
the quantizing unit configured to quantize each sub-vector according to a codebook of code-vectors, and to output an index of the gain and, for each sub-vector, an index of a code-vector of the codebook selected during quantizing. Thereby, this vector quantization scheme is advantageous in that only one gain index has to be quantized and added in the quantized bits. Bits can then be saved in the encoded signal. Particularly, the gain that is obtained by the gain unit may be the maximum value of the partition vector. Alternatively, the gain that is obtained may be a mean value of the partition vector.

In one embodiment, at least one of the vector quantization schemes is based on one of the following schemes:
the common-gain-split-shape vector quantization scheme,
a direct vector quantization scheme consisting in
quantizing the partition vector according to a codebook of code-vectors, and outputting an index of a code-vector of the codebook selected during quantizing,
a split vector quantization scheme consisting in
splitting the partition vector into several sub-vectors,
quantizing each sub-vector according to a codebook of code-vectors, and outputting, for each sub-vector, an index of a code-vector of the codebook selected during quantizing,
a gain-shape vector quantization scheme consisting in
quantizing a gain obtained from the partition vector,
normalizing the partition vector according to the quantized gain, outputting an index of the quantized gain,
quantizing the normalized partition vector according to a codebook of code-vectors, and
outputting an index of a code-vector of the codebook selected during quantizing,
a gain-shape-split vector quantization scheme consisting in
splitting the partition vector into several sub-vectors,
quantizing gains respectively obtained from the sub-vectors, normalizing the sub-vectors according to the respective quantized gain, outputting, for each sub-vector, an index of the respective quantized gain, quantizing each normalized sub-vector according to a codebook of code-vectors, and outputting, for each sub-vector, an index of a code-vector of the codebook selected during quantizing.

Thereby, the encoding may be optimized by choosing a vector quantization scheme from among a plurality of different schemes.

In one embodiment, the partition module is configured to group the matrix coefficients of each signal matrix into the plurality of partition vectors depending on the values of the matrix coefficients. Thereby, the partition i.e. the grouping may be optimized for each signal matrix i.e. for each frame.

Particularly, the values of the matrix coefficients may be values in the time domain or in the frequency domain. Since the grouping depends on the values of the matrix coefficients, this also implies that the grouping may be different for each frame. The grouping of a first signal matrix into partition vectors is then independent from the grouping of a second signal matrix into partition vectors.

In one embodiment, the partition module is configured to group the matrix coefficients of each signal matrix into the plurality of partition vectors depending on the values of the matrix coefficients in that each partition vector comprises the matrix coefficients belonging to a given range of values. Thereby, the partition may be particularly optimized by grouping similar values on a frame basis.

In one embodiment, the partition module is configured to group the matrix coefficients into the plurality of partition vectors based on at least one parameter extracted from the selected vector quantization scheme. Thereby, the partition may be further optimized. The parameter may be, in the time domain of the input signal, an amplitude of the input signal. Alternatively, in case the input signal is transformed—for example by a Fourier transform—in the frequency domain, the parameter may be the frequency bins or the frequency bands. This means that the parameter is, for example, the range of the frequency bands. In addition, generally, the parameter may be derived from the energy concentration/distribution of the coefficients.

In one embodiment, the partition module is configured to group the matrix coefficients into the plurality of partition vectors based on a perceptual model.

The perceptual model may be used for obtaining the at least one parameter extracted from the selected vector quantization scheme. The perceptual model may be comprised in a dedicated module, i.e. in a model-based bit budget allocator, and may depend on the input signal received by the model-based bit budget allocator. Accordingly, the model-based bit budget allocator may transmit to the partition module, in case the time domain of the input signal is considered, the amplitude corresponding to each matrix coefficient. Alternatively, for the frequency domain, the model-based bit budget allocator transmits to the partition module the frequency bin or frequency band corresponding to each matrix coefficient. Thereby, grouping the matrix coefficients into the plurality of partition vectors based on a perceptual model may improve the partitioning/grouping.

In one embodiment, the vector quantization module is configured to select one of the vector quantization schemes for a given partition vector based on an error function of the vector quantization scheme. Thereby, the encoding may be optimized.

Particularly, each VQ scheme has an error function, and especially with an objective error function. Such an error function may be a squared error between the non-quantized and the quantized version of the partition vector. Alternatively, the error function may also be a weighted error function. The selection of the VQ scheme may then be based on the error function, and particularly on a specific value of the error function like a minimum squared error (MSE), a weighted minimum squared error, or a minimum mean squared error (MMSE).

In one embodiment, the encoder comprises a weighting module configured to generate weighting vectors for respectively each vector quantization scheme based on the perceptual model. The vector quantization module is configured to select one of the vector quantization schemes for a given partition vector by:
for each vector quantization scheme:
quantizing the given partition vector based on said vector quantization scheme to obtain a quantized partition vector, computing an error value based on a difference between the given partition vector and said quantized partition vector, computing a weighted error value by multiplying the error value by the weighting vector for said vector quantization scheme, selecting, for the given partition vector, the vector quantization scheme based on the computed weighted error values. Thereby, the scheme selection may be further optimized. Preferably, for the given partition vector, the vector quantization scheme that is selected is the scheme for which the lowest weighted error value is computed.

In one embodiment, the vector quantization module is configured to select one of the vector quantization schemes based on a perceptual model. Thereby, the scheme selection may be further optimized on a frame basis. Preferably, the perceptual model is used to obtain the weighting vectors. The perceptual model may be the same as the one used by the partition module to group the matrix coefficients into the plurality of partition vectors.

For example, the selection of the vector quantization scheme is based on the perceptual model, which corresponds in the frequency domain to a set of perceptual weights for the frequency bands. For example, the weighting vectors are derived in a frequency domain or band by taking the gain that corresponds to the particular frequency band.

In one embodiment, the encoder comprises an assignment module configured to assign, to the vector quantization module of each quantizer module, a number of bits that are usable by the vector quantization module to obtain the quantized bits. The vector quantization module is configured to select one of the plurality of vector quantization schemes in accordance with the number of bits assigned to it by the assignment module. Thereby, the overall number of bits of the quantized bits may be controlled.

In one embodiment, in a variable bit rate mode, there is a maximum value for the total number of quantized bits for each frame, and in a fixed bit rate mode, the total number of quantized bits for each frame is constant. Thereby, in the variable bit rate mode the number of bits of the quantized bits may be limited. In the fixed bit rate mode, the process may be simplified in that the number of quantized bits remains constant.

In one embodiment, the vector quantization module is configured to transmit to the assignment module feedback information about the number of bits that are usable by the vector quantization module to obtain the quantized bits. The bit budget allocator module is configured to modify the maximum number of bits allocated to each vector quantization module depending on the feedback information received from the vector quantization modules. Thereby, the encoding may be optimized depending on the needs of the vector quantization module.

In one embodiment, in the adaptive mode, the vector quantization module is configured to select one of the vector quantization schemes for each partition vector on a frame basis. Thereby, the choice of the vector quantization scheme may be optimized for several frames.

A second aspect of the disclosure relates to a method for encoding an input signal comprising signal frames into quantized bits. The method comprises generating, for each frame of the input signal, a signal matrix comprising matrix coefficients obtained from that frame. The method comprises grouping the matrix coefficients of each signal matrix into a plurality of partition vectors. The method comprises, for each partition vector, selecting one vector quantization scheme from among a plurality of vector quantization schemes and quantizing that partition vector according to the selected vector quantization scheme to obtain the quantized bits. In an adaptive mode, the method comprising grouping differently the matrix coefficients obtained from different frames, and/or selecting different vector quantization schemes for partition vectors obtained from different frames.

Further features or implementations of the method according to the second aspect of the disclosure can perform the functionality of the encoder according to the first aspect of the disclosure and its different embodiments as, for example, described above, and in more detail in context with further embodiments later.

The method according to the second aspect or any of their embodiments may be performed by a processor or a computer.

A third aspect of the disclosure relates to a decoder for decoding quantized bits into an output signal comprising signal frames. The decoder comprises a bitstream parser configured to parse the quantized bits so as to obtain scheme information and vector quantization indices associated to partition vectors. The decoder comprises at least one dequantizer module comprising a vector dequantization module and a partition module. The vector dequantization module comprises a plurality of vector quantization schemes and is configured to, in an adaptive mode and for each partition vector, select one of the vector quantization schemes according to the scheme information associated to that partition vector, and obtain that partition vector by means of the selected vector quantization scheme and according to at least one vector quantization index associated to that partition vector. The partition module is configured to obtain, for each frame, a signal matrix from a plurality of partition vectors associated to that frame. The decoder comprises a synthesis module configured to obtain the output signal from the obtained signal matrices.

Thereby, a vector quantization may be optimized from frame to frame. Particularly, the at least one vector quantization index associated to a partition vector may be codebook index of the vector and a codebook index for the gain In one embodiment, the bitstream parser is configured to parse the quantized bits so as to obtain partition information defining how a signal matrix is obtained from the plurality of partition vectors. The partition module is configured to obtain, for each frame, the signal matrix from the plurality of partition vectors associated to that frame according to the obtained partition information. Thereby, the partition may be optimized from frame to frame.

In one embodiment, the bitstream parser is configured to parse the quantized bits so as to obtain mode information defining the adaptive mode or a fixed mode. In the fixed mode, the vector dequantization module is configured to select the same vector quantization scheme for the partition vectors of different frames. Thereby, it is possible to reduce the amount of side information within the quantized bits, and particularly to reduce the amount of scheme information since the same vector quantization scheme may be selected for the partition vectors of different frames. Particularly, the mode information may consist in one or several bits.

A fourth aspect of the disclosure relates to a method for decoding quantized bits into an output signal comprising signal frames. The method comprises parsing the quantized bits so as to obtain side information and vector quantization indices associated to each partition vector. The method comprises in an adaptive mode and for each partition vector, selecting a vector quantization scheme from among a plurality of vector quantization schemes according to the side information associated to that partition vector, and obtaining that partition vector by means of the selected vector quantization scheme and according to at least one vector quantization index associated to that partition vector. The method comprises obtaining, for each frame, a signal matrix from a plurality of partition vectors associated to that frame. The method comprises obtaining the output signal from the obtained signal matrices.

Further features or implementations of the method according to the fourth aspect of the disclosure can perform the functionality of the decoder according to the third aspect of the disclosure or any of its different embodiments as, for example, described above, and in more detail in context with further embodiments later.

The method according to the fourth aspect or any of their embodiments may be performed by a processor or a computer.

A fifth aspect of the disclosure relates to a computer program having a program code for performing the method according to the second or fourth aspects of the disclosure or any one of their embodiments, when the computer program runs on a computing device.

The functions of the encoder according to the first aspect and the functions of the decoder according to the third aspect and any functions of any of their embodiments may be performed by a processor or a computer, and any of their means or modules may be implemented as software and/or hardware in such a processor or computer.

A further aspect of the disclosure relates to a computer program having a program code for performing such a coding and/or decoding method when the computer program runs on a computing device.

It has to be noted that all devices, elements, units, modules and means described in the disclosure could be implemented in or as software or hardware elements or any kind of combination thereof. All steps which are performed by the various entities described in the disclosure as well as the functionalities described to be performed by the various entities are intended to mean that the respective entity is adapted to or configured to perform the respective steps and functionalities. Even if, in the following description of specific embodiments, a specific functionality or step is performed by external entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and embodiments of the disclosure will be explained in the following description of specific embodiments in relation to the enclosed drawings, in which.

DETAILED DESCRIPTION OF EMBODIMENTS

Figure 1:
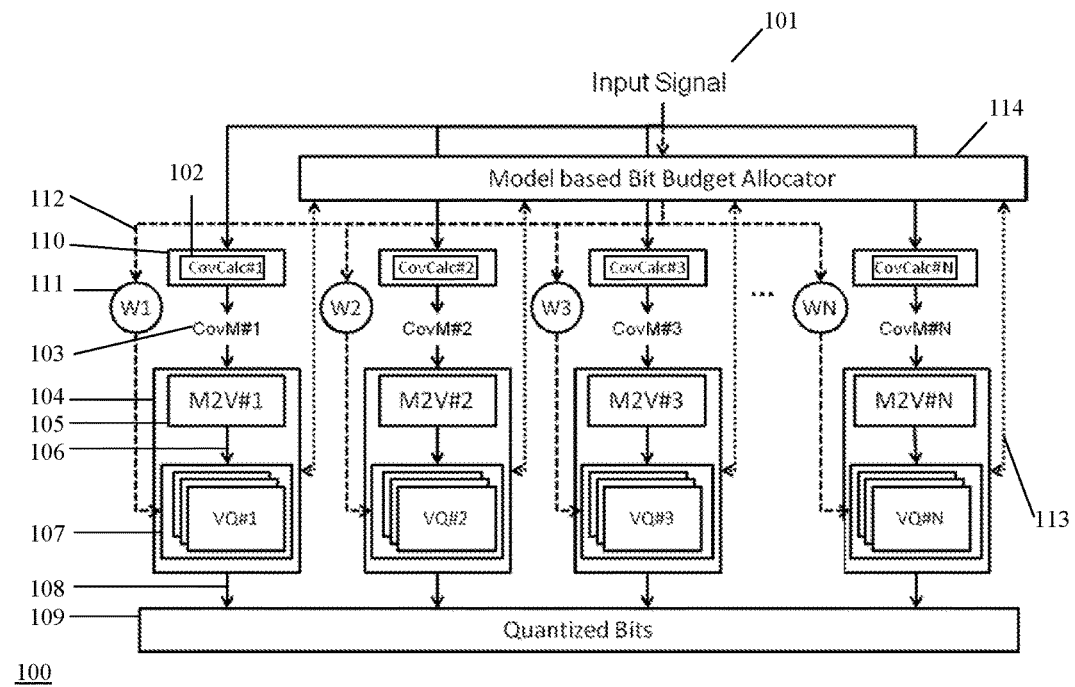
FIG. 1 shows an encoder according to one embodiment of the disclosure.

Embodiments of the disclosure will be described in the followings with respect to FIG. 1 that shows an encoder 100 according to one embodiment of the disclosure for encoding an input signal 101 comprising signal frames into quantized bits 108, and with respect to FIG. 2 that shows a detailed view of an encoder 200 according to one embodiment of the disclosure for encoding an input signal comprising signal frames into quantized bits 208. Particularly, the signal frames are audio and/or video frames. Particularly, the encoder 200 of FIG. 2 is a possible embodiment of the more general encoder 100 of FIG. 1. References 203, 205, 206, 207, 208, and 211 shown in FIG. 2 correspond to references 103, 105, 106, 107, 108, and 111 of FIG. 1 and define identical features or functionally identical features. The following description defines the encoder of the application with respect to FIGS. 1 and 2. However, it is to be understood that the structure of the encoder 200 is more detailed than the structure shown in FIG. 1 and is a particular embodiment of the encoder 100.

The encoder 100 comprises at least one matrix generation module 110 configured to generate, for each frame of the input signal 101, a signal matrix 103, 203, CovM #1, . . . , CovM #N comprising matrix coefficients obtained from that frame.

The encoder comprises at least one quantizer module 104 comprising a partition module, and a vector quantization module.

The partition module 105, 205, M2V #1, . . . , M2V #N is configured to group the matrix coefficients of each signal matrix into a plurality of partition vectors 106, 206, $v_1^1, \ldots, v_1^L$.

The vector quantization module 107, 207 comprises a plurality of vector quantization schemes $VQ_1^1, \ldots, VQ_L^1$ and is configured to, for each partition vector 106, 206, $v_1^1, \ldots, v_1^L$, select one of the vector quantization schemes $VQ_1^1, \ldots, VQ_L^1$ and quantize that partition vector according to the selected vector quantization scheme to obtain the quantized bits 108, 208.

In an adaptive mode, the partition module is able to group differently the matrix coefficients obtained from different frames, and/or the vector quantization module is able to select different vector quantization schemes for partition vectors obtained from different frames. In other words, the partition module may group the matrix coefficients on a frame basis, i.e. independently from frame to frame. Also, the vector quantization module may select the vector quantization schemes on a frame basis, i.e. independently from frame to frame.

One embodiment thus relates to an efficient strategy to encode a large number of matrix coefficients by partitioning the matrix coefficients and selecting the vector quantization schemes on a frame basis in an adaptive way, i.e. depending on the content of the signal matrix, i.e. depending on the matrix coefficients of each signal matrix.

One embodiment relates to grouping the matrix coefficients on a frame basis and on trying to arrange several partitions of the matrix coefficients based on the observation involving the knowledge of the type of input matrix structure: e.g. whether it is a symmetric or diagonal matrix, whether the diagonals are important or not, the distribution and/or correlation of/between coefficients. The aim is to be able to break down e.g. a dynamically changing size of input coefficients into a group of smaller fixed partitions on the fly. Secondly, once this partition has been optimized, the best quantizer scheme to be assigned to each partition is chosen. The choice of the quantizer scheme is based e.g. on a weighted error measure, like e.g. known from Paliwal, K. K. and Atal, B. S., "Efficient Vector Quantization of LPC Parameters at 24 bits/frame" in *IEEE Transactions on Speech and Audio Processing*, vol. 1, no. 1, pp. 3-14, January 1993. In this respect, a scalar quantizer may also be used.

Figure 2:
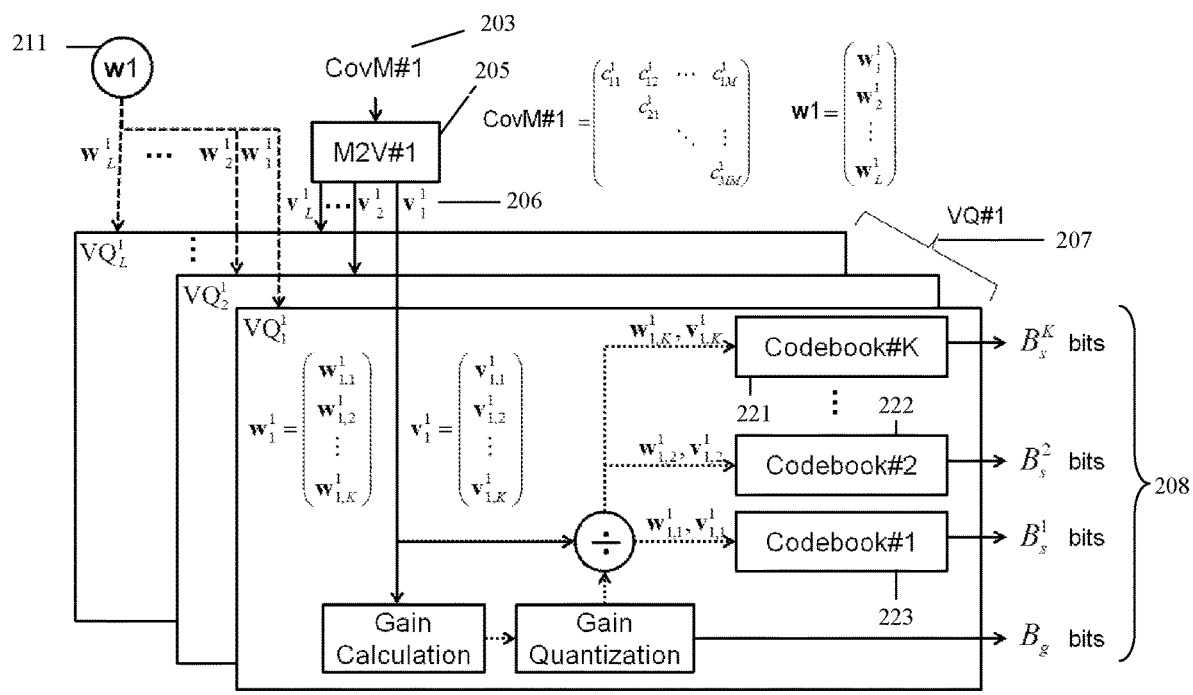
FIG. 2 shows a detailed view of an encoder according to one embodiment of the disclosure.

While one embodiment of the disclosure relates particularly to both audio and video coding, the embodiments of FIGS. 1 and 2 relate to an audio encoder. Accordingly, the input signal 101 may particularly be an audio signal, and the signal matrix may comprise amplitudes of a frame of the audio signal, or may be computed based on the amplitudes of the frame of the audio signal. This means that each matrix coefficient of the signal matrix is an amplitude for a different frequency of the frame. Particularly, a frame may be a set of samples, taken from each channel, having the same timestamp.

Particularly, the matrix generation module 110 may comprise a covariance calculation module 102 CovCalc #1, . . . , CovCalc #N configured to generate the signal matrix as a covariance matrix CovM #1, . . . , CovM #N of the audio signal. Such a covariance matrix is e.g. a known type of square and symmetric matrix.

In the case of video coding, the input signal may be a video signal of an input image, and the signal matrix may comprise intensities of a sub-image of the input image. This means that each matrix coefficient of the signal matrix is an intensity of an image element, e.g. a pixel, of the input image.

Particularly, the encoder may comprise a plurality of parallel matrix generation modules that are each configured to generate a signal matrix describing a different sub-image of the input image, wherein the input image is obtainable from a combination of said different sub-images.

For an audio input signal, a frame may be a set of samples with the same timestamp, taken from each channel. E.g. if the input signal is stereo, one frame comprises several left and right samples. For a video input signal, a frame may be in image of the video signal.

The encoder comprises preferably several matrix generation modules 110 and several quantizer modules 104, each generation module 110 being associated to a quantizer module 104. Different parts of the input signal 101 may be transmitted to different matrix generation modules 110. These different parts are illustrated in FIG. 1 by means of respective plain arrows from the input signal 101 to the generation modules 110. For an audio encoder, different audio channels may be processed in parallel respectively by different matrix generation modules 110 and quantizer modules 104. For a video encoder, different parts of an image frame may be processed in parallel respectively by different matrix generation modules 110 and quantizer modules 104.

In audio, the encoder may efficiently encode a large number of matrix coefficients as a result of an overall coding scheme which aims at encoding a given input signal without any restriction on the input channel configuration, e.g. the number of input channels and the microphone locations in multichannel audio applications. It may mainly be used as part of a Karhunen-Loeve Transform (KLT) audio coding scheme, which requires the encoding of a set of matrix coefficients. The type of matrix in such a case is e.g. a square and symmetric one.

In the encoder, a model based bit budget allocator module 114 uses the input signal 101 or a set of extracted parameters from the input signal, which is highly related to the model being used, as the guidance for a bit allocation scheme and a weighting scheme. FIG. 1 correspondingly shows that the input signal 101 is provided as input of the model based bit budget allocator module 114 by means of a dashed arrow from the input signal 101 to the model based bit budget allocator module 114, while the set of extracted parameters may be extracted by the model based bit budget allocator module 114. For example, a perceptual auditory model and its parameters may be used for the multichannel input audio signals and the input signal can be an M-channel audio signal. The bit allocation scheme assigns and adjusts a certain amount of bits to be used per quantizer module 104 as indicated by a dotted arrow 113 in FIG. 1 between the bit budget allocator 114 and the quantizer module 104. The weighting scheme on the other hand assigns a set of weighting vectors 111, 211, i.e. w1, w2, etc., for each quantizer module 104 and each vector quantization module 107. This assignment is indicated by dashed arrow 112 in FIG. 1. For example, the different parts of the input signal 101 transmitted to the matrix generation modules 110 may respectively have a different importance/priority: if a first part of the input signal 101 has a higher importance/priority than a second part of the input signal 101, then the quantizer module 104 used to process the signal matrix 103 obtained from the first part may be assigned a higher amount of bits than the quantizer module 104 used to process the signal matrix 103 obtained from the second part.

Regarding the weighting scheme, the model based bit budget allocator module 114 may comprise a weighting module configured to generate weighting vectors $w_1^1, \ldots, w_1^L$ for respectively each vector quantization scheme $VQ_1^1, \ldots, VQ_1^1$ based on the perceptual model.

Regarding the bit allocation scheme, the model based bit budget allocator module 114 may comprise an assignment module configured to assign, to the vector quantization module 107, 207 of each quantizer module 104, a number of bits that may be used by the vector quantization module 107, 207 to obtain the quantized bits 108, 208. The vector quantization module 107, 207 may then select one of the plurality of vector quantization schemes $VQ_1^1, \ldots, VQ_L^1$ in accordance with the number of bits assigned to it by the assignment module.

The quantizer module 104 consists of the partition module 105 and a set of pre-defined VQ schemes that is grouped in the vector quantization module 107. For example in audio, this quantizer module 104 takes the calculated covariance matrix CovM #1, . . . , CovM #N to output a set of quantized bits 108, wherein the combination of the quantized bits 108 from all quantizer modules 104 is referred to in FIG. 1 as quantized bits 109. As shown in FIG. 1, the covariance matrix is calculated in the covariance calculation module 102 CovCalc #1, . . . , CovCalc #N.

The partition module 105 provides an optimized vector partition on a frame basis, e.g. based on the structure and statistical analysis of each of the input covariance matrix, and preferably based on the bit allocation scheme. For example, if it has been statistically observed that most of the input matrices have large values at their diagonal, it is suggested to group these diagonal coefficients as one partition vector. The off-diagonal coefficients can be grouped as another partition vector if the allocated bits are limited, otherwise they can also be further grouped into several partition vectors knowing their correlation analysis.

Given the set of vector partition, the VQ module 107 performs the search of a suitable quantization scheme given a set of pre-defined VQ schemes for each partition. Also the VQ module 107 may perform a covariance quantization based on a weighted error measure as in e.g., Paliwal, K. K. and Atal, B. S., "Efficient Vector Quantization of LPC Parameters at 24 bits/frame" in IEEE Transactions on Speech and Audio Processing, vol. 1, no. 1, pp. 3-14, January 1993. This operation takes into account the allocated bits and the weighting vectors.

Note that the quantization may be a vector quantization (VQ) or scalar quantization. Accordingly, any vector quantization module and vector quantizer of the presented embodiments may also be a scalar module and scalar quantizer.

A further aspect of the disclosure relates to the vector quantization module 107, 207 that is configured to transmit 113 to the assignment module feedback information about the number of bits that are usable by the vector quantization module 107, 207 to obtain the quantized bits 108, 208. The assignment module is configured to modify the maximum number of bits allocated to each vector quantization module 107 depending on the feedback information received from the vector quantization modules 107.

This feedback mechanism to the model based bit budget allocator 114 may provide an optimal balancing of the quantization/encoding procedure across all covariance matrices and vectors. The feedback mechanism to the model based bit budget allocator 114 may be used to redistribute the bits if necessary over all parallel signal matrices.

With respect to FIG. 2, at least one vector quantization scheme $VQ_1^1, \ldots, VQ_L^1$ or preferably all vector quantization schemes of the vector quantization module 207 may comprise a splitting unit and a quantization unit.

The splitting unit is configured to split at least one of the plurality of partition vectors 206, $v_1^1, \ldots, v_L^1$ or a vector derived from said at least one of the plurality of partition vectors 206, $v_1^1, \ldots, v_L^1$ into several sub-vectors $v_{1,1}^1, \ldots, v_{1,K}^1$. The derived vector may be a vector generated by a pre-processing unit. The pre-processing unit may be located upstream of the splitting unit, and may apply a gain normalization or a transformation, like matrix or vector multiplication, to the partition vector 206 so as to obtain the derived vector.

The quantizing unit is configured to quantize each sub-vector $v_{1,1}^1, \ldots, v_{1,K}^1$ by selecting a codebook entry from a respective codebook 221, 222, 223 of codebook entries yielding a quantized partition sub-vector. The quantization unit is further configured to output, for each sub-vector $v_{1,1}^1, \ldots, v_{1,K}^1$, an index of the selected codebook entry of the respective codebook 221, 222, 223 selected during quantizing. The selection of the codebook entry is done by applying a weight to each of the elements of the codebook entry.

Particularly, the selected codebook entry may be the best codebook entry with regard to an error measure between the quantized and original signal. A codebook entry may be either a code-vector or a scalar, wherein a scalar is a code-vector of size 1.

FIG. 2 shows a detailed process inside the VQ module 207. The covariance matrix is assumed to be calculated from an M-channel input audio signal and the partition module 105 outputs a set of L vector partitions. Furthermore, it is assumed that the first partition vector $v_1^1$ is quantized by a particular VQ scheme where the partition vector is quantized using a set of K vector-codebooks. Note that the length of each partition vector $v_1^1, \ldots, v_1^1$ may vary and other vector partitions may be quantized by other VQ schemes.

In the following, possible vector quantization schemes $VQ_1^1, \ldots, VQ_L^1$ for the vector quantization module 107, 207 will be presented. These schemes may be used in an encoder and in a decoder according to embodiments of the disclosure.

Generally, vector quantization (VQ) is used for lossy signal compression. In a direct implementation of a VQ, a codebook that holds code-vectors is searched and the index of the code-vector that best represents the input vector is transmitted.

Figure 3:
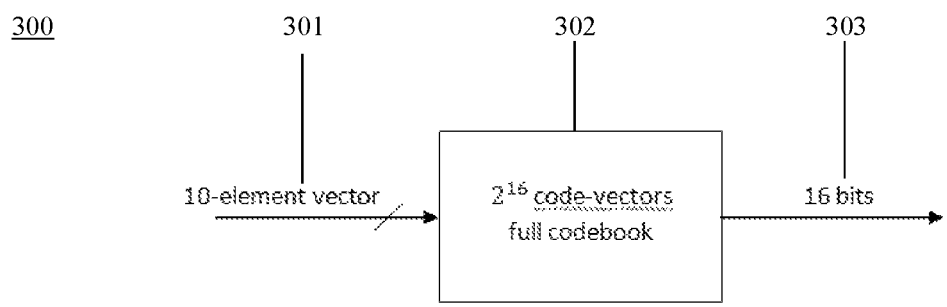
FIG. 3 shows a direct vector quantization scheme according to one embodiment of the disclosure.

FIG. 3 shows a direct vector quantization scheme according to tone embodiment of the disclosure, see e.g. Gersho, A. and Gray, R. M., "Vector Quantization and Signal Compression" Springer, 1992. FIG. 3 shows an example of a direct VQ for a partition vector 301 of 10 elements quantized with 16 bits. The direct VQ scheme 300 may be used as scheme for the VQ module 107 of FIG. 1 or as scheme $VQ_1^1, \ldots, VQ_L^1$ for the VQ module 207 of FIG. 2. Partition vector 301 corresponds to the partition vector 106, 206, $v_1^1, \ldots, v_L^1$.

The direct VQ scheme 300 consists in quantizing the partition vector 301 according to a codebook 302 of code-vectors, and outputting an index 303 of a code-vector of the codebook 302 selected during quantizing. The index has e.g. 16 bits.

In the direct VQ scheme 300, the size of the codebook may be very large and the complexity of searching the codebook may be relatively high. When the dimension of the partition vector is large and the number of bits increases, efficient VQ may be achieved by distributing the bits between several quantization elements, which is also referred to as product—VQ or PVQ.

Figure 4:
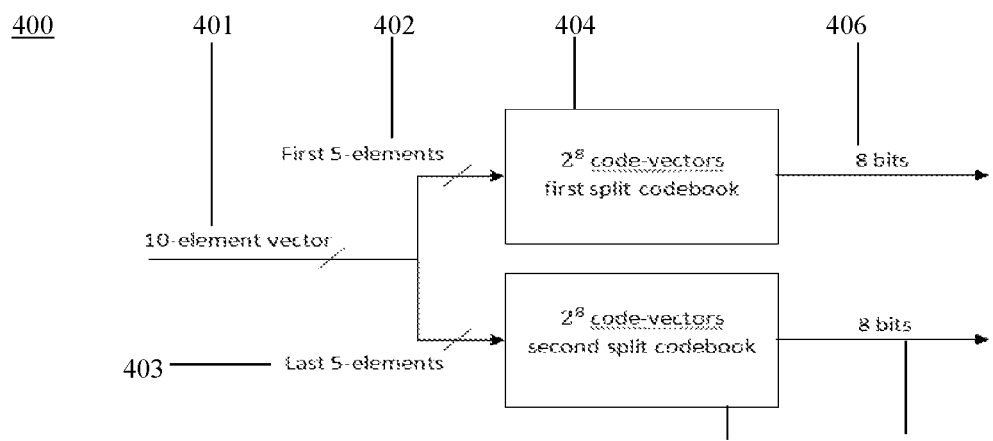
FIG. 4 shows a split vector quantization scheme according to one embodiment of the disclosure.

FIG. 4 shows one approach for such PVQ that is a split vector quantization scheme 400, see e.g. Paliwal, K. K. and Atal, B. S., "Efficient Vector Quantization of LPC Parameters at 24 bits/frame" in IEEE Transactions on Speech and Audio Processing, vol. 1, no. 1, pp. 3-14, January 1993.

The split VQ scheme 400 may be used as scheme for the VQ module 107 of FIG. 1 or as scheme $VQ_1^1, \ldots, VQ_L^1$ for the VQ module 207 of FIG. 2. Partition vector 401 corresponds to the partition vector 106, 206, $v_1^1, \ldots, v_L^1$.

In the split vector quantization scheme 400, parts or sub-vectors 402, 403 of the partition vector 401 vector are quantized separately. For example FIG. 4 shows split-VQ for a partition vector of 10 elements quantized as two sub-vectors with 16 bits.

The split vector quantization scheme 400 consisting in splitting the partition vector 401 into several sub-vectors 402, 403, quantizing each sub-vector 402, 403 according to a codebook 404, 405 of code-vectors, and outputting, for each sub-vector 402, 403, an index 406, 407 of a code-vector of the codebook 404, 405 selected during quantizing.

Figure 5:
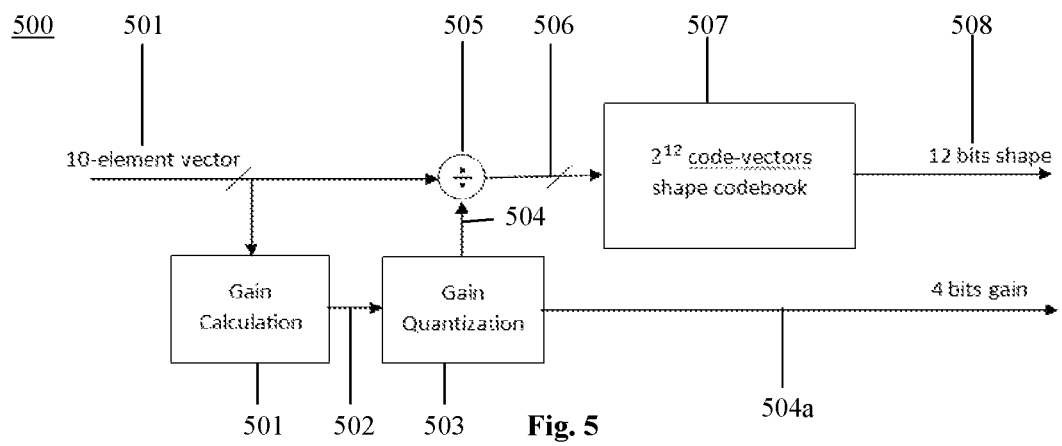
FIG. 5 shows a gain-shape vector quantization scheme according to one embodiment of the disclosure.

FIG. 5 shows another common PVQ structure that is a gain-shape vector quantization scheme, see e.g. Gersho, A. and Gray, R. M., "Vector Quantization and Signal Compression" Springer, 1992. In the gain-shape VQ, a gain factor is first calculated, quantized and used to normalize the partition vector. FIG. 5 relates to an example of gain-shape VQ for a partition vector of 10 elements quantized with 16 bits.

The gain-shape VQ scheme 500 may be used as scheme for the VQ module 107 of FIG. 1 or as scheme $VQ_1^1, \ldots, VQ_L^1$ for the VQ module 207 of FIG. 2. Partition vector 501 corresponds to the partition vector 106, 206, $v_1^1, \ldots, v_L^1$.

The gain-shape vector quantization scheme 500 consists in quantizing a gain 502 obtained from the partition vector 501. The gain 502 may be a maximum value of the partition vector 501, or may be calculated 501 as being a mean value of the coefficients of the partition vector 501. The partition vector 501 is then normalized 505 according to the quantized gain 504 so as to obtain a normalized partition vector 506. The normalized partition vector 506 is quantized according to a codebook 507 of code-vectors. The scheme outputs an index 504*a* of the quantized gain 504, and an index 508 of the code-vector of the codebook selected during quantizing.

When using the gain-shape VQ scheme, the codebooks for both split-VQ and gain-shape VQ may be smaller and therefore storage requirements and search complexity are reduced by PVQ in comparison to e.g. the direct VQ scheme 300.

Figure 6:
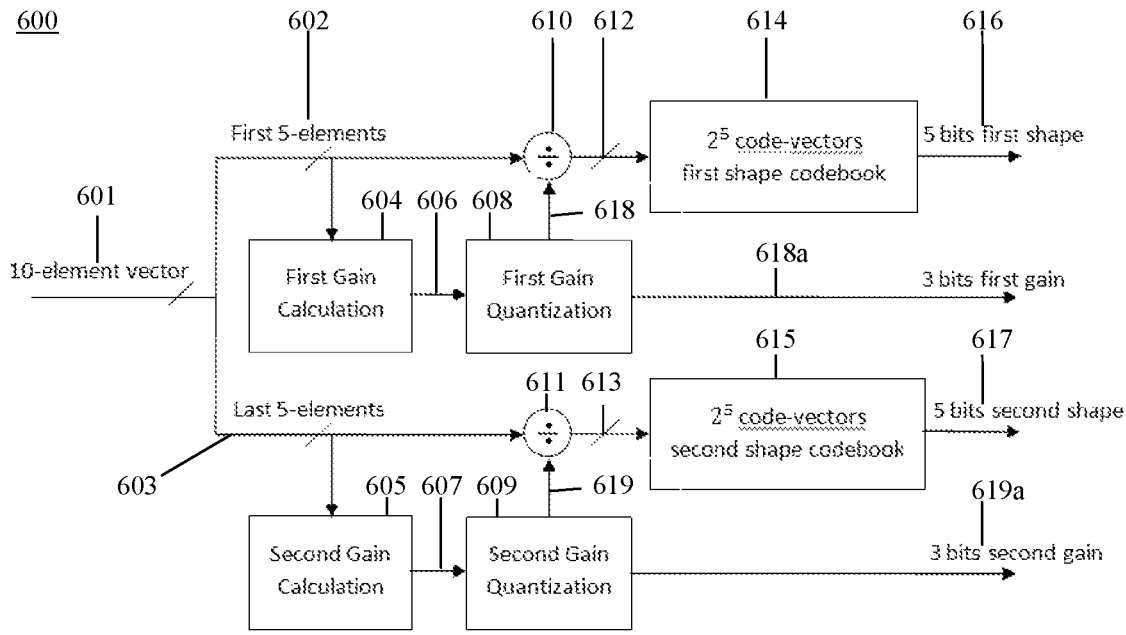
FIG. 6 shows a gain-shape-split vector quantization scheme according to one embodiment of the disclosure.

It is also possible to combine the split-VQ with a gain-shape VQ for additional saving of complexity and storage requirements, see e.g. Cosman, P. C., Gray, R. M., Vetterli, M., "Vector Quantization of Image Subbands: A survery" in IEEE Transactions on Image Processing, vol. 5, no. 2, February 1996. FIG. 6 shows such a gain-shape-split vector quantization scheme 600, and particularly shows an example of gain-shape-split VQ for a partition vector of 10 elements quantized as two sub-vectors with 16 bits.

The gain-shape-split VQ scheme 600 may be used as scheme for the VQ module 107 of FIG. 1 or as scheme $VQ_1^1, \ldots, VQ_L^1$ for the VQ module 207 of FIG. 2. Partition vector 601 corresponds to the partition vector 106, 206, $v_1^1, \ldots, v_L^1$.

The gain-shape-split vector quantization scheme 600 consists in splitting the partition vector 601 into several sub-vectors 602, 603, quantizing gains 606, 607 respectively obtained from the sub-vectors 602, 603, and normalizing the sub-vectors 602, 603 according to the respective quantized gain 618, 619. Each normalized sub-vector 612, 613 is then quantizing according to a codebook 614, 615 of code-vectors. The scheme outputs, for each sub-vector 602, 603, an index 618*a*, 619*a* of the respective quantized gain 618, 619, and an index 616, 617 of a code-vector of the codebook 614, 615 selected during quantizing.

Figure 7:
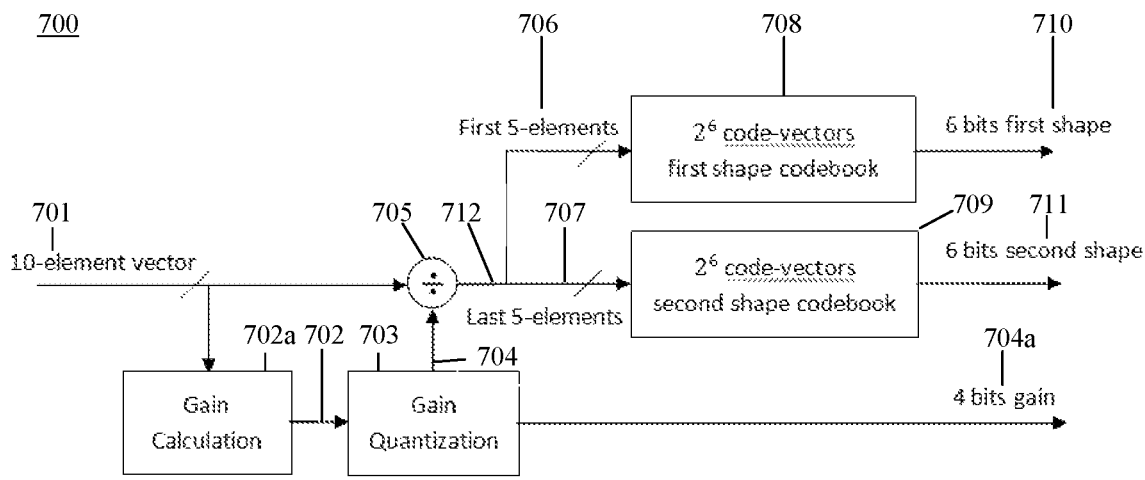
FIG. 7 shows a common-gain-split-shape vector quantization scheme according to one embodiment of the disclosure.

FIG. 7 shows a common-gain-split-shape vector quantization scheme according to one embodiment of the disclosure.

The combination of gain-shape VQ with split VQ according to e.g. FIG. 6 provides further storage and complexity saving, but if the sub-vectors 602, 603 have similar gains 606, 607, transmitting an index 618*a*, 619*a* of the quantized gain 618, 619 for each sub-vector 602, 603 will result in a waste of bits since the indices 618*a*, 619*a* may be identical or very similar.

FIG. 7 particularly shows such a common-gain-split-shape VQ (CGSS-VQ) for a partition vector of 10 elements quantized as two sub-vectors with 16 bits.

The CGSS-VQ scheme 700 may be used as scheme for the VQ module 107 of FIG. 1 or as scheme $VQ_1^1, \ldots, VQ_L^1$ for the VQ module 207 of FIG. 2. Partition vector 701 corresponds to the partition vector 106, 206, $v_1^1, \ldots, v_L^1$.

Generally, the CGSS-VQ 700 in one embodiment of the disclosure comprises a gain unit 702*a* configured to obtain a gain 702 from the partition vector 701. Particularly, the gain 702 that is obtained by the gain unit may be the maximum value of the coefficients of the partition vector. Alternatively, the gain that is obtained may be a mean value of the coefficients of the partition vector.

A quantization unit 703 is configured to quantize the obtained gain 702 to obtain a quantized gain 704. A normalization unit 705 is configured to normalize the partition vector 701 according to the quantized gain 704 to obtain a normalized partition vector 712. A splitting unit is configured to split the normalized partition vector 712 into several sub-vectors 706, 707. A quantizing unit is configured to quantize each sub-vector 706, 707 according to a codebook 708, 709 of code-vectors.

The CGSS-VQ scheme 700 then outputs an index 704*a* of the quantized gain 704 and, for each sub-vector 706, 707, an index 710, 711 of a code-vector of the codebook 708, 709 selected during quantizing.

Figure 9:
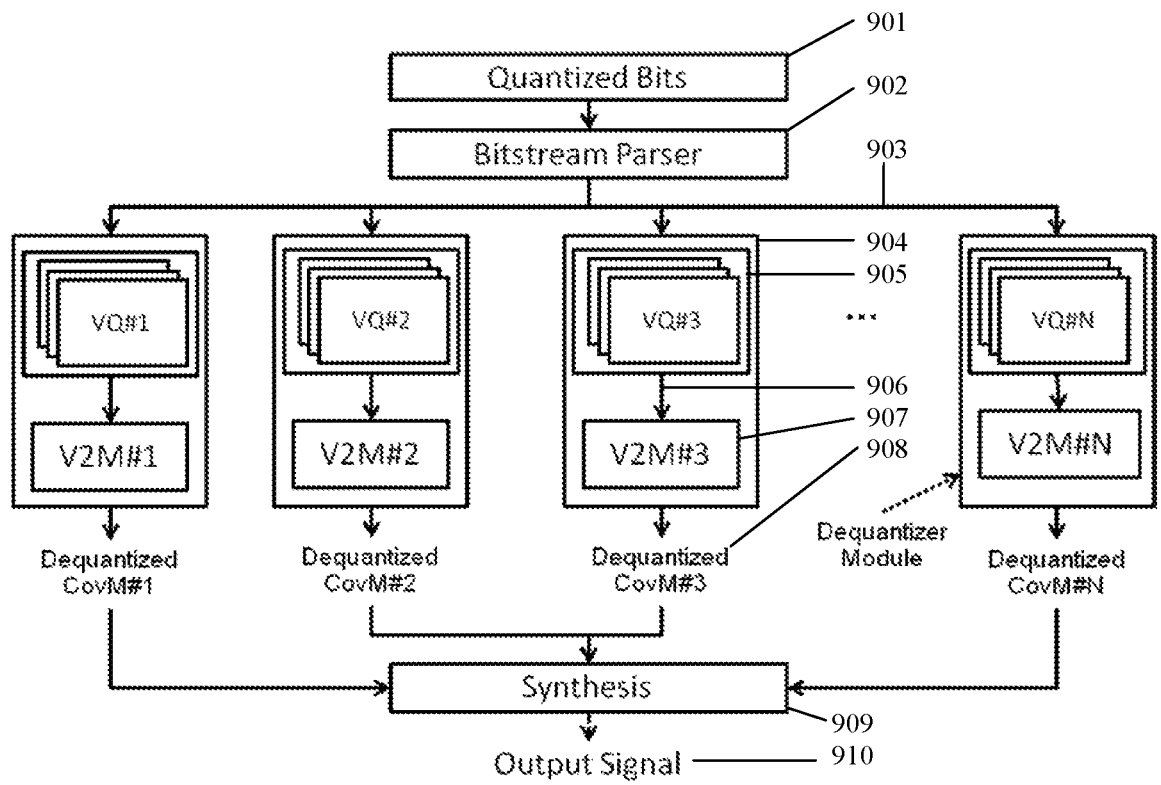
FIG. 9 shows a decoder according to one embodiment of the disclosure.

FIG. 9 shows a decoder 900 according to one embodiment of the disclosure, particularly a decoder 900 for decoding quantized bits 901 into an output signal 910 comprising signal frames. A signal frame may be an audio and/or video frame.

The decoder 900 comprises a bitstream parser 902 configured to parse the quantized bits 901 so as to obtain scheme information and vector quantization index associated to partition vectors, $v_1^1, \ldots, v_L^1$, preferably associated to partition vectors associated to a common signal matrix, wherein preferably the common signal matrix is associated to a signal frame.

The decoder 900 comprises at least one dequantizer module 904 comprising a vector dequantization module 905 and a partition module 907. The vector dequantization module 905 comprises a plurality of vector quantization schemes $VQ_1^1, \ldots, VQ_L^1$ and is configured to, in an adaptive mode and for each partition vector, $v_1^1, \ldots, v_L^1$, select one of the vector quantization schemes $VQ_1^1, \ldots, VQ_L^1$ according to the scheme information associated to that partition vector $v_1^1, \ldots, v_L^1$, and obtain that partition vector 906, $v_1^1, \ldots, v_L^1$, by means of the selected vector quantization scheme $VQ_i^1$ and according to the vector quantization index associated to that partition vector $v_1^1, \ldots, v_L^1$.

The quantization schemes $VQ_1^1, \ldots, VQ_L^1$ of the decoder may correspond to the quantization schemes of the encoder. Particularly, the quantization schemes $VQ_1^1, \ldots, VQ_L^1$ of the decoder may correspond to the direct vector quantization scheme 300 of FIG. 3, the split vector quantization scheme 400 of FIG. 4, the gain-shape vector quantization scheme 500 of FIG. 5, the gain-shape-split vector quantization scheme 600 of FIG. 6, or the common-gain-split-shape vector quantization scheme 700 of FIG. 7.

The partition module 907 is configured to obtain, for each frame, a signal matrix 908 from a plurality of partition vectors 906, $v_1^1, \ldots, v_L^1$ associated to that frame. The signal matrix shown in FIG. 9 is a covariance matrix CovM #1, . . . , CovM #N.

A synthesis module 909 is configured to obtain the output signal 910 from the obtained signal matrices.

Preferably, the bitstream parser 902 is configured to parse the quantized bits 901 so as to obtain partition information defining how a signal matrix is obtained from the plurality of partition vectors. The partition module 907 is configured to obtain, for each frame, the signal matrix from the plurality of partition vectors 906, $v_1^1, \ldots, v_L^1$ associated to that frame according to the obtained partition information.

Particularly, the bitstream parser 902 is configured to parse the quantized bits 901 so as to obtain mode information F/A (fixed/adaptive) defining the adaptive mode or a fixed mode. In the fixed mode, the vector dequantization module 905 is configured to select the same vector quantization scheme $VQ_1^1, \ldots, VQ_L^1$ for the partition vectors $v_1^1, \ldots, v_L^1$ of different frames.

In this respect, the encoder 100 in one embodiment of the disclosure is configured to add in the quantized bits 109 side information bits comprising the partition information, the scheme information, and the vector quantization index.

The partition information is preferably associated to a signal matrix, i.e. to the partition vectors corresponding to a signal matrix, and the partition information identifies how the partition module 105, 205 has grouped the matrix coefficients of a signal matrix into a plurality of partition vectors $v_1^1, \ldots, v_L^1$.

The scheme information is preferably associated to a partition vector $v_1^1, \ldots, v_L^1$ and identifies the vector quantization scheme selected by the vector quantization module 107, 207 for the associated partition vector $v_1^1, \ldots, v_L^1$.

The vector quantization index is preferably associated to a partition vector $v_1^1, \ldots, v_L^1$ and identifies the codebook entry selected by the vector quantization module during quantization of the partition vector.

The mode information is preferably associated to a signal matrix or a partition vector and identifies the adaptive mode or the fixed mode.

Figure 8:
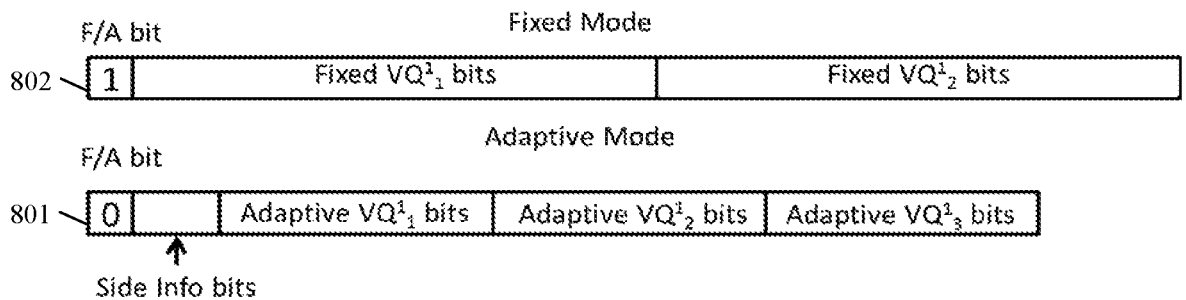
FIG. 8 shows bitstream arrangements according to one embodiment of the disclosure.

FIG. 8 shows bitstream arrangements according to one embodiment of the disclosure.

A first bitstream arrangement 801 corresponds to the adaptive mode and a second bitstream arrangement 802 corresponds to the fixed mode.

Since the quantization process is usually done on frame basis, either a fixed or adaptive bitstream arrangement mode may be utilized, which are referred to as fixed mode and adaptive mode. In case the adaptive mode is used, a set of side information containing some signaling bits, wherein said signaling bits may correspond to the partition information and/or the scheme information and/or the vector quantization index and/or a gain quantization index. For example, if the side information comprise scheme information, the VQs being used is signaled in the bitstream, i.e. in the quantized bits. For example, if the side information comprise gain quantization index, this gain quantization index may correspond to the index 504*a* of the quantized gain 504 of the gain-shape vector quantization scheme 500, the index 618*a*, 619*a* of the quantized gain 618, 619 of the gain-shape-split vector quantization scheme 600, or the index 704*a* of the quantized gain 704 of the common-gain-split-shape vector quantization scheme 700.

For example, assuming the covariance matrix is grouped into two partition vectors in the fixed mode, one partition vector corresponding to the diagonal elements and the other partition vector corresponding to the non-diagonal elements. The partition of the diagonal elements may always be quantized by one fixed VQ scheme and the other partition by another fixed VQ scheme. In such a case, there is no need to send a set of side information bits, and particularly there is no need to send scheme information, since both the encoder and decoder know exactly how to encode/decode.

In the fixed mode, the scheme is preferably already pre-selected for each partition vector. Since the VQ scheme is pre-selected at the encoder and at the decoder, this has the advantage that the decoder already knows which VQ scheme corresponds to which partition vector, so that less side information are needed in the bitstream.

On the other hand, if the VQ scheme is adjusted on a frame basis according to the adaptive mode, side information like partition information and/or scheme information are added in the quantized bits. While the addition of side information might seem to require more bits, it in fact helps to improve the flexibility of the overall bit allocation and the choices between different quantization schemes.

Both bitstream arrangements 801, 802 may comprise mode information indicating if a fixed or adaptive scheme is used. In other words, the mode information defines whether the arrangement is according to the adaptive mode or the fixed mode. For example, as shown in FIG. 8, this mode information may consist in a dedicated F/A bit: the value 1 may define the fixed mode and the value 0 may define the adaptive mode. Alternatively, the mode information may be defined by several bits.

Side information bits may contain information such as the partition of the matrix, VQ schemes being used, bit allocation for each VQ and preferably for each element in each VQ. Side information bits might also simply be a configuration code—e.g. two bits—that signals a choice between several pre-defined VQ schemes.

The disclosure has been described in conjunction with various embodiments as examples as well as implementations. However, other variations can be understood and effected by those persons skilled in the art and practicing the claimed application, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An encoder apparatus for encoding an input signal comprising signal frames into quantized bits, the encoder apparatus comprising:
  at least one matrix generation module executed by a processor configured to generate, for each frame of the input signal, a signal matrix (CovM #1, . . . , CovM #N) comprising matrix coefficients obtained from that frame,
  at least one quantizer module executed by the processor comprising:
    a partition module (M2V #1, M2V #N) executed by the processor configured to group the matrix coefficients of each signal matrix into a plurality of partition vectors $(v_1^1, \ldots, v_L^1)$, and
    a vector quantization module executed by the processor comprising a plurality of vector quantization schemes $(VQ_1^1, \ldots, VQ_L^1)$ and configured to, for each partition vector $(v_1^1, \ldots, v_L^1)$, automatically select one of the plurality of vector quantization schemes $(VQ_1^1, \ldots, VQ_L^1)$ and quantize that partition vector according to the selected vector quantization scheme to obtain the quantized bits,
  wherein each quantization scheme of the plurality of vector quantization schemes $(VQ_1^1, \ldots, VQ_L^1)$ comprises a respective gain unit and a respective quantization unit, and wherein, in an adaptive mode, the partition module selects different vector quantization schemes for different frames.

2. The encoder apparatus of claim 1,
wherein at least one vector quantization scheme $(VQ_1^1, \ldots, VQ_L^1)$ comprises:

a splitting unit executed by the processor configured to split at least one of the plurality of partition vectors $(v_1^1, \ldots, v_L^1)$ or a vector derived from said at least one of the plurality of partition vectors $(v_1^1, \ldots, v_L^1)$ into several sub-vectors $(v_{1,1}^1, \ldots, v_{1,K}^1)$, and wherein the quantization unit is configured to quantize each sub-vector $(v_{1,1}^1, \ldots, v_{1,K}^1)$ by selecting a codebook entry from a respective codebook of codebook entries yielding a quantized partition sub-vector and to output, for each sub-vector $(v_{1,1}^1, \ldots, v_{1,H}^1)$, an index of the selected codebook entry of the respective codebook selected during quantizing, wherein the selection of the codebook entry is done by applying a weight to each of the elements of the codebook entry.

3. The encoder apparatus of claim 1,
wherein at least one of the plurality of vector quantization schemes $(VQ_1^1, \ldots, VQ_L^1)$ is based on a common-gain-split-shape vector quantization scheme and comprises:
  a normalization unit executed by the processor configured to normalize the at least one of the plurality of partition vectors $(v_1^1, \ldots, v_L^1)$ according to the quantized gain to obtain a normalized partition vector,
  the splitting unit executed by the processor configured to split the normalized partition vector into several sub-vectors $(v_{1,1}^1, \ldots, v_{1,K}^1)$, and
  the quantization unit configured to quantize each sub-vector $(v_{1,1}^1, \ldots, v_{1,K}^1)$ according to a codebook of code-vectors, and
to output an index of the quantized gain and, for each sub-vector, an index of a code-vector of the codebook selected during quantizing, wherein the gain unit is executed by the processor and configured to obtain a gain from the at least one of the plurality of partition vectors $(v_1^1, \ldots, v_L^1)$, and the quantization unit is executed by the processor and configured to quantize the obtained gain to obtain a quantized gain.

4. The encoder apparatus of claim 1,
wherein at least one of the vector quantization schemes $(VQ_1^1, \ldots, VQ_L^1)$ is based on one of the following schemes:
  a common-gain-split-shape vector quantization scheme,
  a direct vector quantization scheme consisting in
    quantizing the partition vector according to a codebook of code-vectors, and
    outputting an index of a code-vector of the codebook selected during quantizing,
  a split vector quantization scheme consisting in
    splitting the partition vector into several sub-vectors,
    quantizing each sub-vector according to a codebook of code-vectors, and
    outputting, for each sub-vector, an index of a code-vector of the codebook selected during quantizing,
  a gain-shape vector quantization scheme consisting in
    quantizing a gain obtained from the partition vector,
    normalizing the partition vector according to the quantized gain,
    outputting an index of the quantized gain,
    quantizing the normalized partition vector according to a codebook of code-vectors, and
    outputting an index of a code-vector of the codebook selected during quantizing,
  a gain-shape-split vector quantization scheme consisting in
    splitting the partition vector into several sub-vectors,
    quantizing gains respectively obtained from the sub-vectors,
    normalizing the sub-vectors according to the respective quantized gain,
    outputting, for each sub-vector, an index of the respective quantized gain,
    quantizing each normalized sub-vector according to a codebook of code-vectors, and
    outputting, for each sub-vector, an index of a code-vector of the codebook selected during quantizing.

5. The encoder apparatus of claim 1,
wherein the partition module (M2V #1, M2V #N) is configured to group the matrix coefficients of each signal matrix into the plurality of partition vectors $(v_1^1, \ldots, v_L^1)$ based on values of the matrix coefficients.

6. The encoder apparatus of claim 1,
wherein the partition module (M2V #1, M2V #N) is configured to group the matrix coefficients of each signal matrix into the plurality of partition vectors $(v_1^1, \ldots, v_L^1)$ based on values of the matrix coefficients in that each partition vector comprises the matrix coefficients belonging to a given range of values.

7. The encoder apparatus of claim 1,
wherein the partition module (M2V #1, M2V #N) is configured to group the matrix coefficients into the plurality of partition vectors $(v_1^1, \ldots, v_L^1)$ based on at least one parameter extracted from the selected vector quantization scheme.

8. The encoder apparatus of claim 1,
wherein the partition module (M2V #1, M2V #N) is configured to group the matrix coefficients into the plurality of partition vectors $(v_1^1, \ldots, v_L^1)$ based on a perceptual model.

9. The encoder apparatus of claim 1,
wherein the vector quantization module is configured to select one of the vector quantization schemes $(VQ_1^1, \ldots, VQ_L^1)$ for a given partition vector $(v_1^1, \ldots, v_L^1)$ based on an error function of the vector quantization scheme.

10. The encoder apparatus of claim 9,
wherein the vector quantization module is configured to select one of the vector quantization schemes based on a perceptual model.

11. The encoder apparatus of claim 1,
further comprising:
  a weighting module executed by the processor configured to generate weighting vectors $(w_1^1, \ldots, w_L^1)$ for respectively each vector quantization scheme $(VQ_1^1, \ldots, VQ_L^1)$ based on a perceptual model,
wherein the vector quantization module is configured to select one of the vector quantization schemes $(v_1^1, \ldots, v_L^1)$ for a given partition vector by:
  for each vector quantization scheme $(VQ_i^1)$:
    quantizing the given partition vector based on said vector quantization scheme $(VQ_i^1)$ to obtain a quantized partition vector,
    computing an error value based on a difference between the given partition vector and said quantized partition vector,
    computing a weighted error value by multiplying the error value by the weighting vector $(w_i^1)$ for said vector quantization scheme $(VQ_i^1)$,
  selecting, for the given partition vector, the vector quantization scheme $(VQ_1^1, \ldots, VQ_L^1)$ based on the computed weighted error values.

12. The encoder apparatus of claim 1,
comprising an assignment module executed by the processor configured to assign, to the vector quantization module of each quantizer module, a number of bits that are usable by the vector quantization module to obtain the quantized bits,
wherein the vector quantization module is configured to select one of the plurality of vector quantization schemes ($VQ_1^1, \ldots, VQ_L^1$) in accordance with the number of bits assigned to it by the assignment module.

13. The encoder apparatus of claim 12,
wherein, in a variable bit rate mode, there is a maximum value for the total number of quantized bits for each frame, and
in a fixed bit rate mode, the total number of quantized bits for each frame is constant.

14. The encoder apparatus of claim 12,
wherein the vector quantization module is configured to transmit to the assignment module feedback information about the number of bits that are usable by the vector quantization module to obtain the quantized bits, and
wherein the assignment module is configured to modify the maximum number of bits allocated to each vector quantization module based on the feedback information received from the vector quantization modules.

15. The encoder apparatus of claim 1,
wherein, in an adaptive mode, the vector quantization module is configured to select one of the vector quantization schemes ($VQ_1^1, \ldots, VQ_L^1$) for each partition vector ($v_1^1, \ldots, v_L^1$) on a frame basis.

16. A decoder apparatus for decoding quantized bits into an output signal comprising signal frames,
the decoder apparatus comprising:
a bitstream parser executed by a processor configured to parse the quantized bits so as to obtain scheme information and vector quantization indices associated to partition vectors ($v_1^1, \ldots, v_L^1$),
at least one dequantizer module comprising:
a vector dequantization module executed by the processor comprising a plurality of vector quantization schemes ($VQ_1^1, \ldots, VQ_L^1$) and configured to, in an adaptive mode and for each partition vector ($v_1^1, \ldots, v_L^1$), automatically select one of the plurality of vector quantization schemes ($VQ_i^1$) according to the scheme information associated to that partition vector ($v_1^1, \ldots, v_L^1$), and obtain that partition vector ($v_1^1, \ldots, v_L^1$) by means of the selected vector quantization scheme ($VQ_i^1$) and according to at least one vector quantization index associated to that partition vector ($v_1^1, \ldots, v_L^1$), wherein different vector quantitation schemes are selected for different frames in the adaptive mode and wherein each quantization scheme of the plurality of vector quantization schemes ($VQ_1^1, \ldots, VQ_L^1$) comprises a respective gain unit and a respective quantization unit,
a partition module executed by the processor configured to obtain, for each frame, a signal matrix from a plurality of partition vectors ($v_1^1, \ldots, v_L^1$) associated to that frame,
a synthesis module executed by the processor configured to obtain the output signal from the obtained signal matrices.

17. The decoder apparatus of claim 16,
wherein the bitstream parser is configured to parse the quantized bits so as to obtain partition information defining how a signal matrix is obtained from the plurality of partition vectors, and
wherein the partition module is configured to obtain, for each frame, the signal matrix from the plurality of partition vectors ($v_1^1, \ldots, v_L^1$) associated to that frame according to the obtained partition information.

18. The decoder apparatus of claim 16,
wherein the bitstream parser is configured to parse the quantized bits so as to obtain mode information (F/A) defining the adaptive mode or a fixed mode,
wherein, in the fixed mode, the vector dequantization module is configured to select the same vector quantization scheme ($VQ_1^1, \ldots, VQ_L^1$) for the partition vectors ($v_1^1, \ldots, v_L^1$) of different frames.

19. A method for decoding quantized bits into an output signal comprising signal frames,
the method comprising:
parsing the quantized bits so as to obtain side information and vector quantization indices associated to each partition vector ($v_1^1, \ldots, v_L^1$),
in an adaptive mode and for each partition vector ($v_1^1, \ldots, v_L^1$), automatically selecting a vector quantization scheme ($VQ_i^1$) from among a plurality of vector quantization schemes ($VQ_1^1, \ldots, VQ_L^1$) according to the side information associated to that partition vector ($v_1^1, \ldots, v_L^1$), and obtaining that partition vector ($v_1^1, \ldots, v_L^1$) by means of the selected vector quantization scheme ($VQ_i^1$) and according to at least one vector quantization index associated to that partition vector ($v_1^1, \ldots, v_L^1$), wherein different vector quantitation schemes are selected for different frames in the adaptive mode and wherein each quantization scheme of the plurality of vector quantization schemes ($VQ_1^1, \ldots, VQ_L^1$) comprises a respective gain unit and a respective quantization unit,
obtaining, for each frame, a signal matrix from a plurality of partition vectors ($v_1^1, \ldots, v_L^1$) associated to that frame, and
obtaining the output signal from the obtained signal matrices.

* * * * *